F. X. FRANK.
BICYCLE SLED.
APPLICATION FILED JAN. 29, 1918.
1,268,229.
Patented June 4, 1918.
2 SHEETS—SHEET 2.
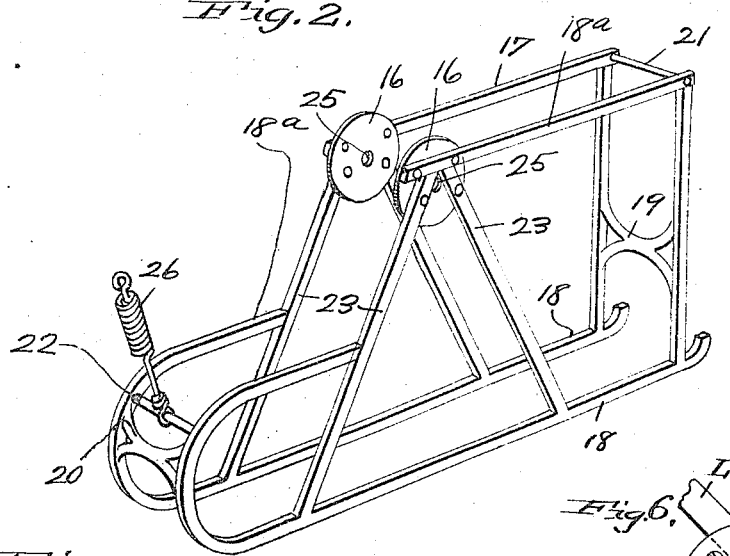
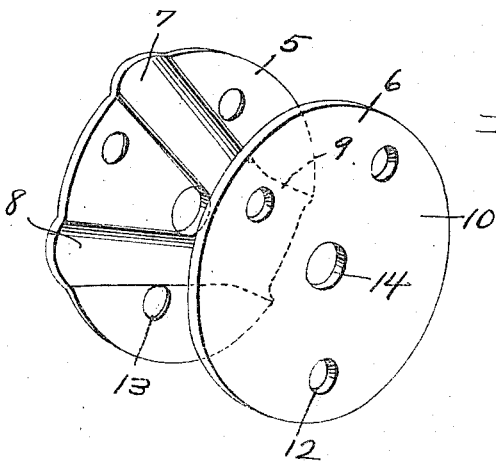
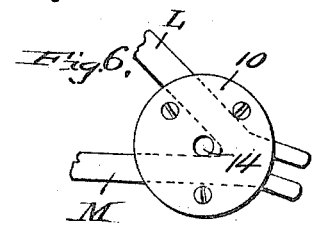
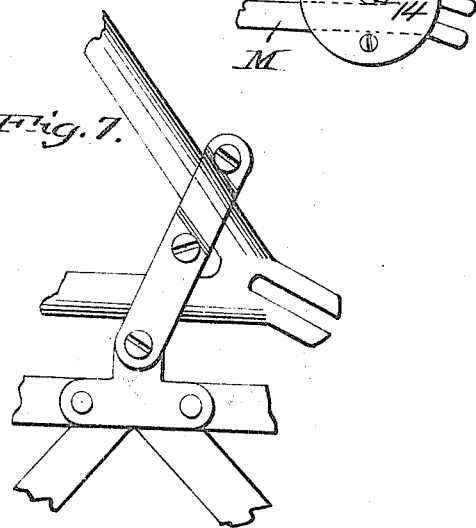
WITNESSES
INVENTOR
Francis X. Frank,
ATTORNEY

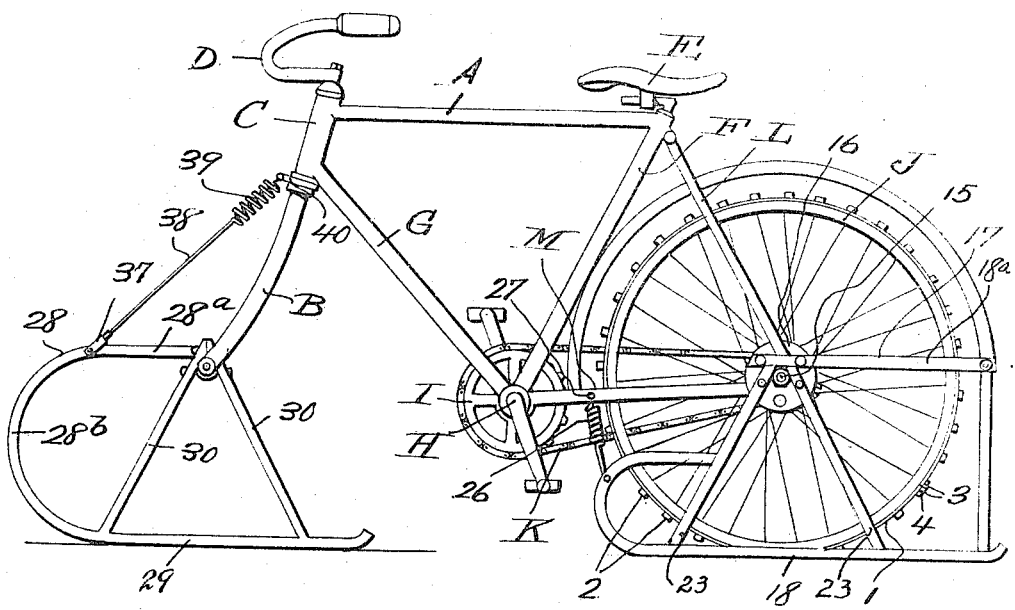
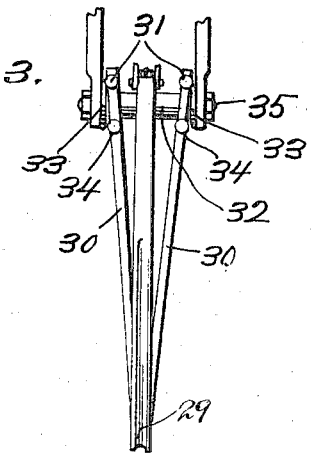
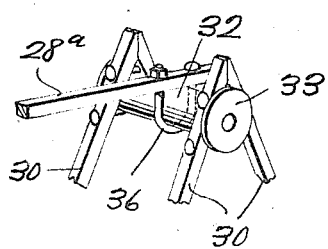

UNITED STATES PATENT OFFICE.

FRANCIS X. FRANK, OF WALKERTON, ONTARIO, CANADA.

BICYCLE-SLED.

1,268,229.

Specification of Letters Patent.

Patented June 4, 1918.

Application filed January 29, 1918. Serial No. 214,355.

*To all whom it may concern:*

Be it known that I, FRANCIS X. FRANK, a subject of the King of Great Britain, residing at Walkerton, in the Province of Ontario and Dominion of Canada, have invented certain new and useful Improvements in Bicycle-Sleds, of which the following is a specification.

This invention relates to bicycle sleds, and more particularly to means for quickly and easily converting a bicycle of ordinary construction into a vehicle specially adapted for traveling on icy or slippery surfaces.

One of the main objects of the invention is to provide a device of the character stated of simple construction and operation which may be produced at relatively small cost. A further object is to provide front and rear runners which may be readily applied to a bicycle. Another object is to provide means for applying the runners to a bicycle of standard construction without necessitating any variations in the structure of the bicycle itself. Further objects will appear from the detailed description.

In the drawings:

Figure 1 is a side view of a bicycle sled constructed in accordance with my invention.

Fig. 2 is a perspective side view of the back runner.

Fig. 3 is a front view of the front runner.

Fig. 4 is a fragmentary detail perspective of the means for securing the front runner to the front hub.

Fig. 5 is a perspective detail of the securing and supporting plates for the back runner.

Fig. 6 is a side view of the same as applied.

Fig. 7 is a detail of a modified means for securing the back runner to the bicycle frame.

The bicycle frame designated generally by A is of standard construction being provided with the front fork B having a standard extending through the front sleeve C to which the handle bars D are secured in the usual manner for steering purposes. A seat E is mounted in the seat post F the lower end of which is secured to the inclined frame bar G, the pedals H being rotatably supported at the point of juncture between the standard and this bar for operating the sprocket wheel I so as to rotate the rear wheel J by means of sprocket chain K in the well known manner, this wheel being rotatably supported in the back fork L braced by the brace bars M.

In applying my invention, the usual pneumatic tire is removed from the wheel and is replaced by a tire 1 of wood or other suitable material provided with the radially projecting gripping studs 2. This tire is provided at each end with an offset ear 3, these ears being provided with suitable apertures to receive a securing bolt 4 inserted therethrough, this bolt serving to secure the tire tightly about the wheel, and the ears of lugs 3 coöperating to form a gripping lug similar to the lugs 2. At the vertex of the angle formed by the bars of fork L and brace bars M, I provide two securing and supporting plates 5 and 6. The inner plate 5 is provided with inclined grooves 7 and 8 the inner ends of which converge to form a single groove 9 which constitutes a stem of a Y formed by the grooves 7, 8, and 9. These grooves are adapted to snugly receive the rearward portions of the frame bars L and M. The outer plate 10 fits snugly against the outer surfaces of the frame bars and is secured to the inner plate by means of spaced bolts 11 secured through alined openings 12 and 13 in plates 10 and 5, respectively, the openings 12 being counter-sunk, and the heads of the bolts 11 being shaped so as to fit snugly into the same, the outer surfaces of the heads being flush with the outer surface of plate 10. The plates are also provided with central openings 14 which are in alinement when the plates are in operative position. Plates 5 and 10 thus provide a clamp at each side of the fork L, each clamp being composed of two plates having alined openings 14. These clamps which are in alinement transversely of the fork are adapted to receive a securing axle 15 which is inserted through the alined pairs of plates. This axle is also inserted through bracing disks 16 provided at each side of the back runner 17. This runner is a double runner being composed of the spaced members 18 the forward portions of which are of semi-elliptical outline and are reduced in height to avoid interference with the pedals of the bicycle, which are connected by the cross braces 19 and 20 and the cross bars 21 and 22. The disk 16 is secured to the upper bar 18$^a$ of member 18 slightly in advance of the center thereof, the upper ends of the inclined brace bars 23 being also secured to this disk, the lower ends of these bars being secured to the runner 24 in the usual manner. The disks 16 are provided with central openings 25 which are in alinement transversely of the rear runner 17. When the runner is in proper position, the inner faces of disks 16 fit snugly against the outer faces of disks 10, and the axle 15 is then passed through alined openings in all of these disks and secured therein by means of nuts threaded on the ends of the axle, or in any other suitable manner. By this construction, the rear runner 17 is secured to the back fork L for rocking movement about the axle 15. A coil tension spring 26 has its lower end secured to the cross bar 22, and its upper end secured, as at 27 to the brace bar M. This spring acts to normally maintain the rear runner 17 in a substantially horizontal position, while permitting rocking movement of the same about shaft 15 so as to accommodate passage of the runner over any unevenness in the surface upon which the vehicle travels, or obstacles which may be encountered. This spring also acts to absorb, to a large extent, all shocks and jars due to unevenness in the traction surface, thus producing a very easy riding vehicle.

A front runner 28 is mounted in front fork B. The lower bar 29 of this runner is braced by the downwardly and inwardly inclined brace bars 30 which are secured together at their upper ends by a bolt 31 inserted through the same. These bars are placed over the front hub 32 adjacent each end plate or flange 33 thereof, and a lower securing bolt 34 is passed through the braces in such a position as to be closely adjacent the lowermost point of the hub. The bolts 31 and 34 thus coöperate to prevent vertical movement of runner 28 relative to the hub while permitting rocking movement of the runner about the hub spindle 35. As the brace rods 30 are closely adjacent the inner faces of each end flange 33, lateral movement of the front runner is effectually prevented. The rearward end of upper bar 28$^a$ of runner 28 is secured by a U-clip 36 to the hub 32. The upper bar 28$^a$ is a continuation of the lower bar, being connected thereto by the forward arcuate portion 28$^b$. A swivel member 37 is pivotally secured to bar 28$^a$ adjacent the forward end thereof. A cable 38 is secured to swivel member 37 and to the forward end of a tension coil spring 39 the upper end of which is secured to a collar 40 mounted on the lower end of sleeve C. By this construction, the forward runner is mounted in the front fork B so as to be rockable in the same, being normally maintained in a substantially horizontal position by the tension spring 39. This runner may be turned in either direction laterally by means of the handle bars D so as to steer the sled in the same manner as a bicycle is steered.

What I claim is:

1. In a bicycle sled, a frame provided with a front fork and a downwardly and rearwardly inclined back fork, brace bars extending rearwardly of the frame and secured at their rearward ends to the lower ends of the bars of the rear fork, clamps secured to the adjacent end portions of the bars of the fork and said brace bars, said clamps being provided with openings in alinement transversely of the fork, a drive wheel rotatably mounted in the rear fork, a rear runner rockably mounted on the rear fork, and a runner rockably mounted in the front fork.

2. In a bicycle sled, a frame, a front fork and a rear fork carried thereby, clamps detachably secured to the said rear forks adjacent the lower ends thereof and provided with apertures in alinement transversely of the fork, a supporting shaft mounted in said clamps, a drive wheel rotatably mounted on said shaft, a back runner rockably secured on said shaft, and a front runner rockably mounted in the front fork.

In testimony whereof I affix my signature in presence of two witnesses.

FRANCIS X. FRANK.

Witnesses:
  A. COLLINS,
  M. VROJUSORE.

Copies of this patent may be obtained for five cents each, by addressing the "Commissioner of Patents, Washington, D. C."